United States Patent
Hubbard et al.

(10) Patent No.: US 6,332,860 B1
(45) Date of Patent: Dec. 25, 2001

(54) MODEL-BASED ON-COMING CLUTCH PRESSURE CONTROL FOR AN AUTOMATIC TRANSMISSION UPSHIFT

(75) Inventors: Gregory A Hubbard, Carmel; Jeffrey Kurt Runde, Fishers, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/528,609

(22) Filed: Mar. 20, 2000

(51) Int. Cl.[7] ................................................. B60K 41/06
(52) U.S. Cl. ............................ 477/143; 477/155; 701/60
(58) Field of Search ........................... 701/60; 477/143, 477/155, 156, 164

(56) References Cited

U.S. PATENT DOCUMENTS

| | | | |
|---|---|---|---|
| 5,029,086 | * 7/1991 | Yoshimura | 701/60 |
| 5,058,460 | 10/1991 | Hibner et al. | 477/154 |
| 5,123,302 | * 6/1992 | Brown et al. | 477/155 |

* cited by examiner

*Primary Examiner*—Sherry Estremsky
(74) *Attorney, Agent, or Firm*—Laura C. Hargitt

(57) ABSTRACT

An improved control for an automatic transmission upshift, wherein the on-coming clutch pressure (Ponc) is scheduled during the torque and inertia phases of the shift in accordance with the summation of feed-forward and feed-back control terms, the feed-forward control term being developed using an inverse dynamic model of the transmission. The feed-forward control term is determined by developing a desired acceleration trajectory of the input shaft, and periodically applying the acceleration trajectory to the inverse dynamic model to obtain an estimate of the required on-coming clutch pressure, given the transmission input torque. The feed-back control term is based on a comparison of the expected input speed response with the actual input speed response, and corrects for modeling errors in the feed-forward control, providing disturbance rejection and improved command following. Additionally, the closed-loop feedback error is used to enable adaptive correction of the feed-forward control so that the estimated on-coming clutch pressure more nearly produces the commanded input shaft acceleration. Controlling the input shaft acceleration in this manner achieves more consistent shift feel and energy dissipation in the on-coming clutch, with less intensive calibration effort and improved adaptability to different powertrain and vehicle-type configurations.

7 Claims, 3 Drawing Sheets

| | CLUTCH | | | | |
|---|---|---|---|---|---|
| RANGE | C1 | C2 | C3 | C4 | C5 |
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X | ns
MODEL-BASED ON-COMING CLUTCH PRESSURE CONTROL FOR AN AUTOMATIC TRANSMISSION UPSHIFT

TECHNICAL FIELD

This invention relates to a model-based shift control for an automatic transmission, and more particularly to a pressure control of the on-coming clutch during an upshift.

BACKGROUND OF THE INVENTION

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset.

Shifting from a currently established speed ratio to new speed ratio involves, in most cases, disengaging a clutch (off-going clutch) associated with the current speed ratio and engaging a clutch (on-coming clutch) associated with the new speed ratio. Various combinations of shift type (upshift or downshift) and power flow (power-on or power-off) have been analyzed for control purposes in order to achieve consistent high quality shifting. Power-on upshifting, the subject of this invention, is generally characterized as comprising three phases: a fill phase in which an apply chamber of the on-coming clutch is filled with hydraulic fluid in preparation for torque transmission, a torque phase in which a torque exchange between on-coming and off-going clutches occurs without a corresponding speed change, and an inertia phase in which the input shaft changes speed.

Various techniques have been used for electronically controlling the above-mentioned phases of a power-on upshift; see, for example, the U.S. Pat. No. 5,058,460 to Hibner et al., issued on Oct. 22, 1991, and assigned to the assignee of the present invention. In Hibner et al., the fill, torque and inertia phases are carried out by successively executed control routines. In the fill phase, the on-coming clutch pressure (referred to herein as Ponc) is commanded to a maximum value for a predetermined fill time, or until a pull-down of the input speed is detected. The torque phase is then carried out by releasing the off-going clutch, reducing Ponc to an initial value, and then progressively increasing Ponc until a pull-down of the input speed is detected. Thereafter, the inertia phase is carried out by adjusting Ponc as required to drive the input speed to its post-shift level in accordance with a predetermined speed vs. time profile. In Hibner et al., the clutch pressure (on-coming and off-going) is controlled in an open-loop manner during the fill and torque phases, but is controlled in a closed-loop manner based on input speed error during the inertia phase. In another technique described in the U.S. Pat. No. 4,707,789 to Downs et al., issued on Nov. 17, 1987, and assigned to the assignee of the present invention, the clutch pressures are controlled in an open-loop manner, and the open-loop parameters are adaptively adjusted after a shift is completed based on parameters measured during the shift, such as the inertia phase time or the occurrence of over-filling or under-filling.

SUMMARY OF THE INVENTION

The present invention is directed to an improved control for an automatic transmission upshift, wherein the on-coming clutch pressure (Ponc) is scheduled during the torque and inertia phases of the shift in accordance with the summation of feed-forward and feed-back control terms, the feed-forward control term being developed using an inverse dynamic model of the transmission. The feed-forward control term is determined by developing a desired acceleration trajectory of the input shaft, and periodically applying the acceleration trajectory to the inverse dynamic model to obtain an estimate of the required on-coming clutch pressure, given the transmission input torque. The feed-back control term is based on a comparison of the expected input speed response with the actual input speed response, and corrects for modeling errors in the feed-forward control, providing disturbance rejection and improved command following. Additionally, the closed-loop feedback error is used to enable adaptive correction of the feed-forward control so that the estimated on-coming clutch pressure more nearly produces the commanded input shaft acceleration. Controlling the input shaft acceleration in this manner achieves more consistent shift feel and energy dissipation in the on-coming clutch, with less intensive calibration effort and improved adaptability to different powertrain and vehicle-type configurations.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
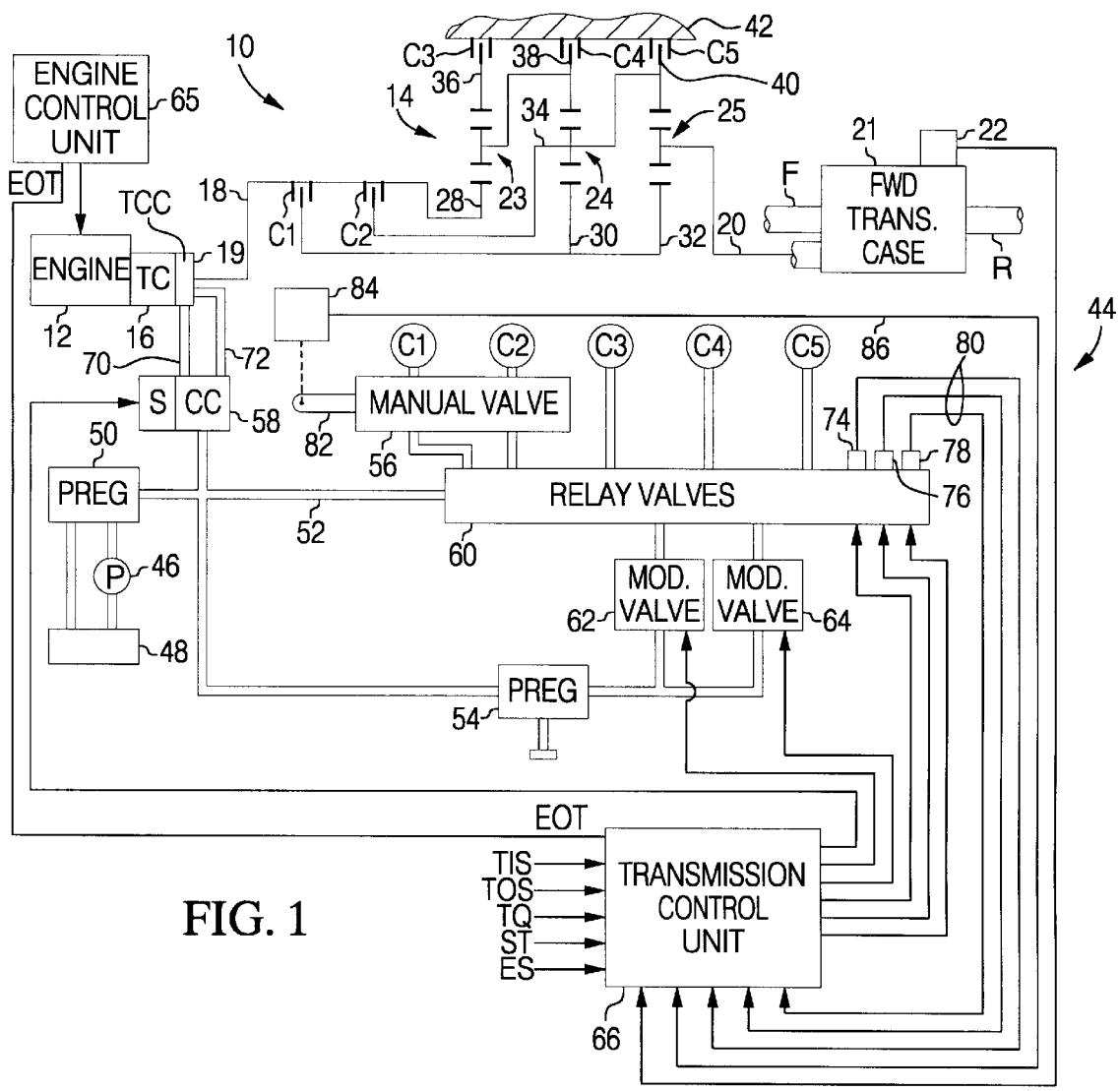
FIG. 1 is a diagram of an automatic transmission and microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on depending on the control variables afforded by engine 12, and the transmission control unit 66 controls the solenoid operated fluid control valves 58–64 based on a number of inputs to achieve a desired transmission speed ratio. The transmission control unit inputs include signals representing the transmission input speed TIS, a driver torque command TQ, and the transmission output speed TOS. Sensors for developing such signals may be conventional in nature, and have been omitted for simplicity. Additionally, the engine control unit 65 supplies an engine output torque signal EOT to transmission control unit 66.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch, develops corresponding force motor current commands, and then supplies current to the respective force motors in accordance with the current commands.

As explained above, previously known control systems have developed the on-coming clutch pressure during the inertia phase of a power-on upshift using either an open-loop control strategy based on a calibrated clutch pressure vs. time trajectory, or a closed-loop control strategy based on the deviation of the input shaft speed TIS from a calibrated input speed vs. time trajectory. An example of an open-loop control strategy is described in the aforementioned U.S. Pat. No. 4,707,789, and an example of the closed-loop control strategy is described in the aforementioned U.S. Pat. No. 5,058,460, both of which are incorporated herein by reference.

The present invention is directed to an improved control strategy for the inertia phase of a power-on upshift, wherein the on-coming clutch pressure (Ponc) is scheduled in accordance with the summation of feed-forward and feed-back control terms, with the feed-forward control term being developed using an inverse dynamic model of transmission 14. The feed-forward control term is determined by developing a desired acceleration trajectory of the input shaft 18, and periodically applying the acceleration trajectory to the inverse dynamic model to obtain an estimate of the required on-coming clutch pressure, given the transmission input torque. The feed-back control term is based on a comparison of the expected input shaft speed with the measured speed TIS, and corrects for modeling errors in the feed-forward control, providing disturbance rejection and improved command following. Additionally, the closed-loop feedback error is used to enable adaptive correction of the feed-forward control so that the estimated on-coming clutch pressure more nearly produces the commanded input shaft acceleration.

Figure 3:
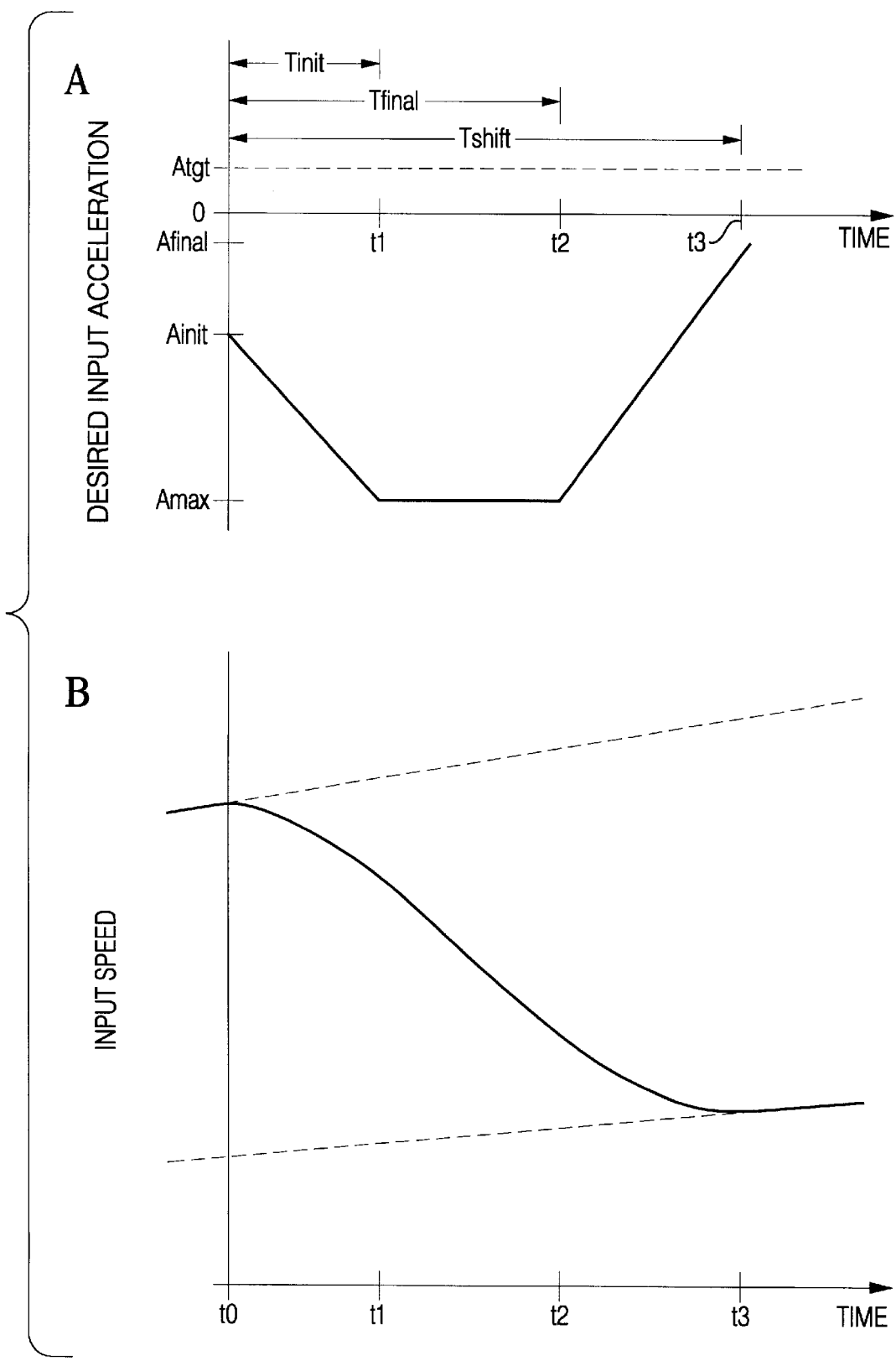
FIG. 3, Graphs A and B, graphically depict the inertia phase of an upshift according to this invention. Graph A depicts a desired acceleration trajectory of the input shaft, and Graph B depicts the corresponding speed trajectory of the input shaft.

In FIG. 3, Graph A depicts a desired input acceleration trajectory for the inertia phase of a power-on upshift from a current speed ratio SRold to a new speed ratio SRnew, assuming a constant output acceleration Aout during the shift, and Graph B depicts a corresponding input speed profile. In practice, the output acceleration Aout may vary during a shift, as explained below. As seen in Graph B, the input speed prior to the inertia phase is determined by the product TOS*SRold, whereas the input speed at the conclusion of the inertia phase is determined by the product TOS*SRnew.

The parameters of the acceleration trajectory of Graph A include the initial acceleration Ainit, the maximum acceleration Amax, the final acceleration Afinal, and the times Tinit, Tfinal, and Tshift. The terms Ainit and Amax are determined based on measured parameters, while the terms Afinal, Tinit, Tfinal and Tshift are determined by calibration as a ftinction of one or more other parameters. For example, Tshift may be determined as a function of driver torque demand TQ, whereas Tinit and Tfinal may be predetermined percentages of Tshift. The value of Afinal is a calibrated value selected to achieve smooth shift completion. The target acceleration Atgt represents the input shaft acceleration at the conclusion of the inertia phase, and is determined according to the product (Aout*SRnew). As explained more fully below in reference to FIG. 4, Ainit is computed based on the transmission input torque and the desired output torque at the end of the torque phase, and Amax is computed based on the acceleration trajectory parameters and speed difference across the on-coming clutch, referred to herein as the slip speed.

Figure 4:
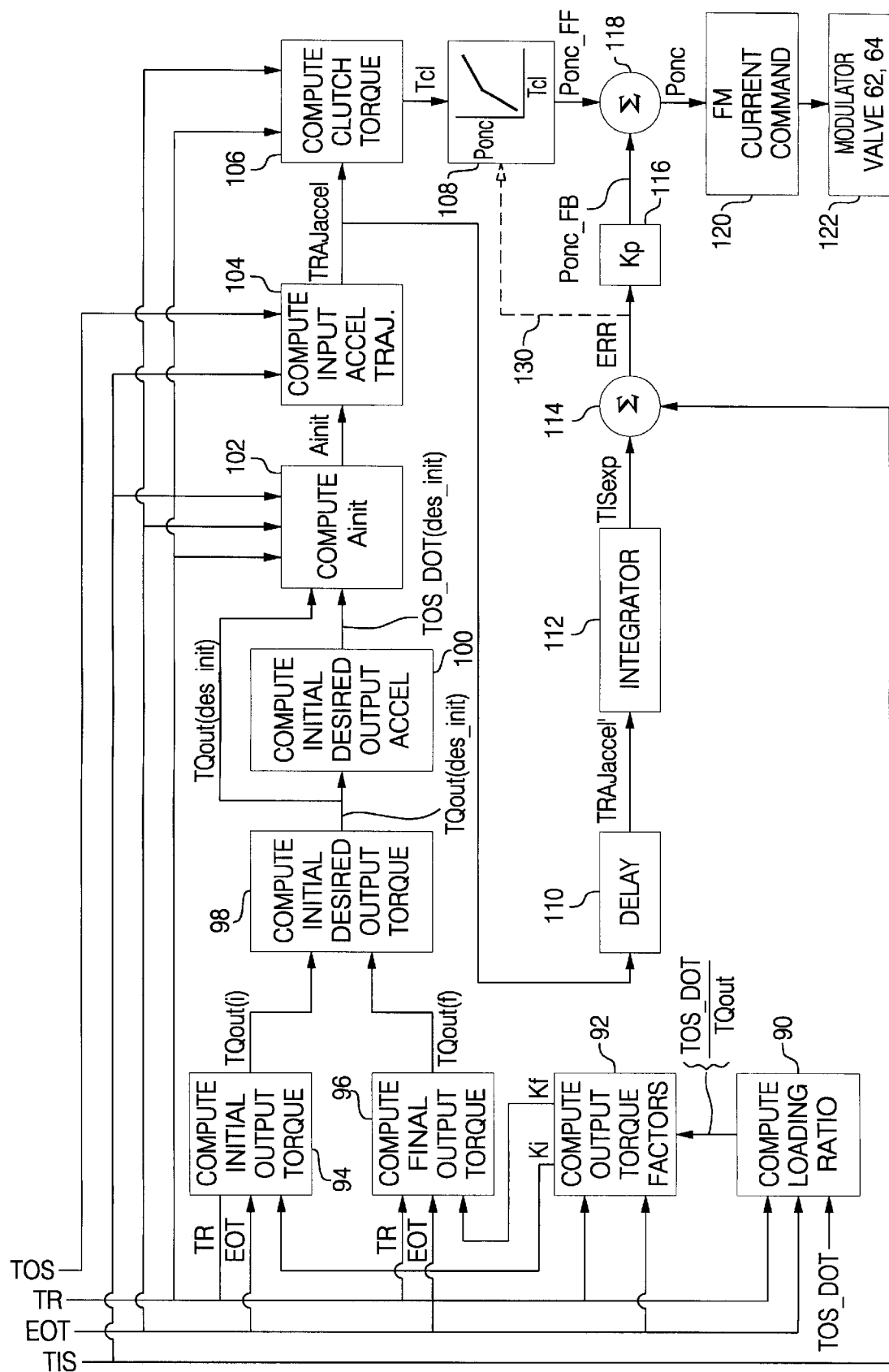
FIG. 4 is a block diagram illustrating the control carried out by the control unit of FIG. 1 according to this invention.

A block diagram of the control strategy of this invention is depicted in FIG. 4, with the various blocks representing functions performed by the transmission control unit 66. The inputs include the engine output torque EOT, the engine speed ES, the transmission input speed TIS, the transmission output speed TOS, and the torque ratio TR of torque converter 16. Various other inputs are derived from these inputs, such as the transmission output acceleration (referred to herein as TOS_DOT), the engine acceleration (referred to herein as ES_DOT), the torque converter speed ratio SR (that is, TIS/ES), and the rate of change of the speed ratio SR (referred to herein as SR_DOT). The feed-forward control, represented by the blocks 90–108, produces a feed-forward pressure command Ponc_FF, and the feed-back control, represented by the blocks 110–116, produces a feed-back pressure command Ponc_FB. The feed-forward and feed-back pressure commands are then summed in the summer 118 to form the on-coming clutch pressure command Ponc. The pressure command Ponc, in turn, is applied as an input to the block 120, which develops a current command for the respective modulated valve 62, 64.

Referring to the feed-forward control, the blocks 90 and 92 represent functions performed at the initiation of a shift command. The block 90 computes an estimate of the vehicle load and mass in terms of transmission output acceleration per unit transmission output torque, or (TOS_DOT/TQout). The output torque term TQout is computed prior to the initiation of shifting according to the equation:

$$TQ\text{out} = (K1*TR*EOT) + (K2*TOS\_DOT) + (K3*TR*ES\_DOT)$$

where the constants K1, K2 and K3 are determined by calibration. The block 92 then computes torque scale factors Ki and Kf relating transmission output torque TQout to transmission input torque TQin for the initial and final speed ratios involved in the shift. In other words, Ki defines the ratio TQout/TQin for the initial speed ratio, and Kf defines the ratio TQout/TQin for the final speed ratio. The torque scale factors Ki and Kf are nearly equal to the initial and final speed ratios of the transmission 14, respectively, with some variation due to the effects of engine and transmission inertia. The actual values of Ki and Kf may be computed using the equation:

$$TOS\_DOT = (A*TQ\text{in}) + (B*TQ\text{out}),$$

and setting TOS_DOT equal to the product of TQout and the determined ratio (TOS_DOT/TQout) to account for the load and mass effects.

Once the ratio (TOS_DOT/TQout) and the torque scale factors Ki, Kf have been determined, the blocks 94–102 determine the initial value Ainit of the acceleration trajectory for the shift. The blocks 94 and 96 compute output torque values TQout(i), TQout(f) for the initial and final speed ratios involved in the shift, using the equations: TQout(i)=Ki*TR*EOT, and TQout(f)=Kf*TR*EOT. The block 98 then computes an initial value of the desired torque phase output torque TQout(des$_{13}$ init) according to the equation:

$$TQ\text{out}(des\_init) = K[TQ\text{out}(i) - TQ\text{out}(f)] + TQ\text{out}(f)$$

where K is a calibration parameter. The block 100 then applies TQout(des_init) to the ratio (TOS_DOT/TQout) to determine the initial value of the desired torque phase output acceleration, or TOS_DOT(des_init). Finally, the block 102 computes the initial input shaft acceleration (that is, Ainit) required to produce the desired initial output torque TQout(des_init) and the desired initial output acceleration TOS_DOT(des_init), given the engine torque EOT, engine speed ES, and torque converter parameters. The transmission input and output acceleration values TIS_DOT and TOS_DOT during a shift are modeled according to the equations:

$$TIS\_DOT = (a1*TQ\text{in}) + (a2*TQ\text{cl}) + (a3*TQ\text{out})$$

$$TOS\_DOT = (b1*TQ\text{in}) + (b2*TQ\text{cl}) + (b3*TQ\text{out})$$

where a1, a2, a3, b1, b2 and b3 are calibration constants, and TQc1 is the torque capacity of the on-coming clutch, assuming an ideal transition between the on-coming and off-going clutches. Solving the model equations to eliminate TQcl, expressing TQin in terms of EOT, ES, TIS_DOT, and the torque converter parameters SR and SR_DOT, and solving for TIS_DOT yields an expression for Ainit in terms of TQout (des_init), TOS_DOT(des_init), EOT, ES, SR, SR_DOT, and calibration constants Ka-Ke, as follows:

$$A\text{init} = [Ka*TR*(EOT + Kb*ES*(SR\_DOT/SR)) + Kc*TQ\text{out} + Kd*TOS\_DOT]/(1 + Ke(TR/SR))$$

The initial desired acceleration Ainit is computed repeatedly during the fill phase of the shift to account for any changes in EOT and/or TOS_DOT, and a value of Ainit at the end of the fill phase is supplied as an input to block 104. The output of block 104 is the input acceleration trajectory (TRAJaccel), and the trajectory value is maintained at Ainit until the input speed TIS begins to change toward the new speed ratio SRnew (that is, until the onset of the inertia phase of the shift). Thereafter, the block 104 repeatedly computes the trajectory TRAJaccel based on the computed slip speed SLIP of the on-coming clutch and the trajectory parameters Ainit, Afnl, Tinit, Tshift, and Tfinal. The slip speed SLIP at any time t is computed in accordance with the equation:

$$SLIP(t) = (TOS*SR\text{new}) - TIS + [A\text{tgt}*(T\text{shift} - t)]$$

where Atgt is the target acceleration of the transmission input shaft 18 (computed as the product TOS_DOT*SRnew) and Tshift is the selected duration of the inertia phase. The acceleration trajectory parameter Amax, in turn, is computed so that the area under the acceleration trajectory is equal to SLIP. The trajectory parameters, including Atgt, SLIP and Amax, are computed periodically during the shift to reflect any changes in the output acceleration TOS_DOT.

Block 106 represents an inverse dynamic model of the transmission, and computes an on-coming clutch torque command that will satisfy the input acceleration trajectory TRAJaccel, given the engine output torque EOT and the torque converter characteristics. The basic model equations are the same as those given above in respect to block 102, but in this case, the equations are solved for the on-coming clutch torque TQcl, yielding:

$$TQcl=[K1+K2(TR/SR)]TRAJaccel+[K3*TR*EOT]+[K4*TR*SR\_DOT*ES/SR]$$

where K1, K2, K3 and K4 are constants (including the mass/load ratio TOS_DOT/TQout). The clutch torque TQcl, in turn, is applied to block 108, which outputs the feed-forward pressure Ponc_FF. In the illustrated embodiment, the block 108 represents a look-up table of clutch pressure vs. clutch torque for the particular on-coming clutch, and comprises a discrete number of data points forming a piece-wise linear approximation of the pressure vs. torque relationship. As indicated by the broken line 130, the data points are subject to adaptive adjustment based on the closed-loop speed error, as a means of compensating for any modeling errors of block 106.

Referring to the feed-back control, the block 110 develops a delayed version (TRAJaccel') of the input acceleration trajectory, which is then integrated by the block 112 to form an expected input speed (TISexp), given the combined electrical and hydraulic delays in producing the commanded on-coming pressure Ponc. The delay period may be determined by calibration, and the acceleration trajectory TRAJaccel may be integrated using a conventional discrete trapezoidal integration technique, as represented by the equation:

$$TISexp(current)=TISexp(last)+T/2[TRAJ(current)+TRAJ(last)]$$

where TISexp(current) and TISexp(last) are the current and last values of the expected input speed, T is the update rate, and TRAJ(current) and TRAJ(last) are the current and last values of the input acceleration trajectory TRAJaccel. The expected input speed so developed is then applied along with the measured input speed TIS to summer 114, forming an input speed error ERR. The block 116 applies a proportional gain term to ERR to form the feed-back pressure component Ponc_FB, which is combined with Ponc_FF as explained above.

In summary, the control of this invention uses an inverse dynamic model of the transmission to compute the on-coming clutch pressure required to achieve a desired input acceleration trajectory during the inertia phase of an upshift. The trajectory is delayed and integrated to determine the expected input speed response, which is compared with the measured input speed to form a closed-loop pressure correction that compensates for any modeling errors. The acceleration trajectory, in turn, is constructed so as to achieve a desired shift feel. The initial acceleration value Ainit is computed to achieve a desired output torque and acceleration, and the dynamic portion of the trajectory is computed to achieve a desired shift time and final output acceleration value. The shifting calibration effort is greatly simplified as compared with known open-loop controls, since the calibration parameters (shift time Tshift, for example) are well-defined and directly relate to observable characteristics of the shift. Any modeling errors of the feed-forward control are detected in the form of closed-loop error, and the control compensates for the errors through corresponding adjustment the feed-forward control—specifically, the data points of the clutch pressure vs. clutch torque transfer function table (block 108).

While described in reference to the illustrated embodiment, it will be understood that various modifications in addition to those mentioned above will occur to those skilled in the art. For example, various parameters, such as engine torque, vehicle loading, and the torque converter characterization may be determined by alternative methods than disclosed herein. Thus, it will be understood that controls incorporating these and other modifications may fall within the scope of this invention, which is defined by the appended claims.

What is claimed is:

1. A method of controlling an on-coming clutch pressure during an inertia phase of an upshift of a motor vehicle automatic transmission having an input shaft coupled to a vehicle engine and an output shaft coupled to drive the vehicle, the method comprising the steps of:

developing a desired acceleration trajectory of the input shaft;

applying the desired acceleration trajectory to an inverse dynamic model of the transmission during the inertia phase of the upshift to obtain an estimate of a required on-coming clutch torque capacity at a given output torque level of the engine;

developing a feed-forward clutch pressure command based on the estimated clutch torque;

developing on-coming clutch pressure in accordance with the pressure command;

measuring a speed of the input shaft; and adjusting the pressure command in accordance with a feed-back adjustment based on a deviation of the measured speed from an expected speed of the input shaft to compensate for errors in said dynamic model.

2. The method of claim 1, wherein the step of developing a desired acceleration trajectory of the input shaft includes the steps of:

computing an initial acceleration value prior to the inertia phase of the upshift; and computing a trajectory acceleration value during the inertia phase of the upshift as a function of the initial acceleration value, and a desired duration of the inertia phase.

3. The method of claim 2, wherein the initial acceleration value is computed so as to achieve a desired initial output acceleration and a desired initial output torque at the given output torque level of the engine.

4. The method of claim 1, wherein a look-up table is used to develop the feed-forward clutch pressure command based on the estimated clutch torque, and the look-up table is adjusted based on the deviation of the measured speed from the expected speed of the input shaft so that the feed-forward clutch pressure command more accurately produces the desired acceleration trajectory of the input shaft.

5. The control method of claim 1, wherein the expected speed of the input shaft is determined by delaying and integrating the desired acceleration trajectory.

6. The control method of claim 5, wherein the on-coming clutch pressure is developed by an electro-hydraulic system, and in determining the expected speed of the input shaft, the desired acceleration trajectory is delayed by an amount corresponding to an expected delay of the electro-hydraulic system in developing on-coming clutch pressure in accordance with the pressure command.

7. An upshift control method for a motor vehicle transmission having an input shaft coupled to a vehicle engine and an output shaft coupled to drive the vehicle, in which fluid pressure is supplied to an on-coming clutch of the transmission in accordance with a pressure command, the improvement wherein the control method includes the steps of:

developing a desired acceleration trajectory of the input shaft;

applying the desired acceleration trajectory to an inverse dynamic model of the transmission during an inertia phase of the upshift to obtain an estimate of a required on-coming clutch torque capacity at a given output torque level of the engine;

developing a feed-forward control term based on the estimated clutch torque;

generating the pressure command in accordance with the feed-forward control term;

measuring a speed of the input shaft; and adjusting the pressure command in accordance with a feed-back adjustment based on a deviation of the measured speed from an expected speed of the input shaft to compensate for errors in said dynamic model.

* * * * *